(12) United States Patent
Green (10) Patent No.: US 7,287,428 B2
(45) Date of Patent: Oct. 30, 2007

(54) INERTIAL SENSOR WITH A LINEAR ARRAY OF SENSOR ELEMENTS

(75) Inventor: John A. Green, Tewksbury, MA (US)

(73) Assignee: Analog Devices, Inc., Norwood, MA (US)

( * ) Notice: Subject to any disclaimer, the term of this patent is extended or adjusted under 35 U.S.C. 154(b) by 149 days.

(21) Appl. No.: 11/106,039

(22) Filed: Apr. 14, 2005

(65) Prior Publication Data

US 2005/0229705 A1 Oct. 20, 2005

Related U.S. Application Data

(60) Provisional application No. 60/561,931, filed on Apr. 14, 2004.

(51) Int. Cl.
G01P 9/04 (2006.01)
G01P 15/00 (2006.01)
(52) U.S. Cl. .................................. 73/504.12; 73/504.14
(58) Field of Classification Search ............. 73/504.02, 73/504.04, 504.12, 504.14, 514.32, 514.38, 73/504.16
See application file for complete search history.

(56) References Cited

U.S. PATENT DOCUMENTS

| | | | |
|---|---|---|---|
| 2,309,853 A | 2/1943 | Lyman et al. | |
| 4,381,672 A | 5/1983 | O'Connor et al. | 73/505 |
| 4,510,802 A | 4/1985 | Peters | 73/505 |
| 4,524,619 A | 6/1985 | Staudte | 73/505 |
| 4,598,585 A | 7/1986 | Boxenhorn | 73/505 |
| 4,654,663 A | 3/1987 | Alsenz et al. | 73/517 |
| 4,744,248 A | 5/1988 | Stewart | 73/505 |
| 4,744,249 A | 5/1988 | Stewart | 73/505 |
| 4,884,446 A | 12/1989 | Ljung | 73/505 |
| 5,016,072 A | 5/1991 | Greiff | 357/26 |
| 5,016,076 A | 5/1991 | Darwish | 357/38 |
| 5,025,346 A | 6/1991 | Tang et al. | 361/283 |
| 5,056,366 A | 10/1991 | Fersht et al. | 73/505 |
| 5,111,693 A | 5/1992 | Greiff | 73/514 |
| 5,144,184 A | 9/1992 | Greiff | 310/312 |
| 5,195,371 A | 3/1993 | Greiff | 73/505 |

(Continued)

FOREIGN PATENT DOCUMENTS

WO WO93/05401 3/1993

(Continued)

OTHER PUBLICATIONS

Weinberg et al. *A Micromachined Comb-Drive Tuning Fork Rate Gyroscope*, Proceedings of the 49th Annual Meeting of the Institute of Navigation, Jun. 21-23, 1993, 7 pages.

(Continued)

*Primary Examiner*—Helen C. Kwok
(74) *Attorney, Agent, or Firm*—Bromberg & Sunstein LLP (57) ABSTRACT

An inertial sensor includes at least one pair of sensor elements arranged in a linear array. Each sensor element has a frame and a movable mass suspended within the frame. The frames of each pair of sensor elements may be coupled so that the frames are allowed to move in anti-phase to one another along parallel axes but are substantially prevented from moving in phase with one another.

21 Claims, 5 Drawing Sheets

U.S. PATENT DOCUMENTS

| | | | |
|---|---|---|---|
| 5,203,208 A | 4/1993 | Bernstein | 73/505 |
| 5,216,490 A | 6/1993 | Greiff et al. | 73/517 |
| 5,241,861 A | 9/1993 | Hulsing, II | 73/505 |
| 5,259,247 A | 11/1993 | Bantien | 73/718 |
| 5,273,939 A | 12/1993 | Becker et al. | 437/209 |
| 5,313,835 A | 5/1994 | Dunn | 73/505 |
| 5,329,815 A | 7/1994 | Dunn et al. | 73/505 |
| 5,341,682 A | 8/1994 | Hulsing, II | 73/505 |
| 5,343,749 A | 9/1994 | Macy | 73/505 |
| 5,349,855 A | 9/1994 | Bernstein et al. | 73/505 |
| 5,359,893 A | 11/1994 | Dunn | 73/505 |
| 5,367,217 A | 11/1994 | Norling | 310/370 |
| 5,377,544 A | 1/1995 | Dunn | 73/505 |
| 5,392,650 A | 2/1995 | O'Brien et al. | 73/517 |
| 5,408,877 A | 4/1995 | Greiff et al. | 73/505 |
| 5,481,914 A | 1/1996 | Ward | 73/504.16 |
| 5,492,596 A | 2/1996 | Cho | 156/632.1 |
| 5,496,436 A | 3/1996 | Bernstein et al. | 156/628.1 |
| 5,505,084 A | 4/1996 | Greiff et al. | 73/504.14 |
| 5,511,419 A | 4/1996 | Dunn | 73/504.08 |
| 5,515,724 A | 5/1996 | Greiff et al. | 73/504.12 |
| 5,530,342 A | 6/1996 | Murphy | 324/158.1 |
| 5,535,902 A | 7/1996 | Greiff | 216/2 |
| 5,537,872 A | 7/1996 | Frere et al. | 73/504.12 |
| 5,555,765 A | 9/1996 | Greiff | 73/504.09 |
| 5,574,222 A | 11/1996 | Offenberg | 73/514.32 |
| 5,581,035 A | 12/1996 | Greiff | 73/514.32 |
| 5,600,064 A | 2/1997 | Ward | 73/504.04 |
| 5,600,065 A | 2/1997 | Kar et al. | 73/504.12 |
| 5,604,309 A | 2/1997 | Ward | 73/504.02 |
| 5,604,312 A | 2/1997 | Lutz | 73/504.14 |
| 5,608,351 A | 3/1997 | Ward | 330/107 |
| 5,635,638 A | 6/1997 | Geen | 73/504.04 |
| 5,635,639 A | 6/1997 | Greiff et al. | 73/504.04 |
| 5,635,640 A | 6/1997 | Geen | 73/504.12 |
| 5,646,348 A | 7/1997 | Greiff et al. | 73/514.36 |
| 5,650,568 A | 7/1997 | Greiff et al. | 73/504.09 |
| 5,672,949 A | 9/1997 | Ward | 318/609 |
| 5,696,323 A | 12/1997 | Hulsing, II | 73/504.12 |
| 5,717,140 A | 2/1998 | Hulsing, II | 73/504.16 |
| 5,734,105 A | 3/1998 | Mizukoshi | 73/504.02 |
| 5,747,961 A | 5/1998 | Ward et al. | 318/646 |
| 5,763,781 A | 6/1998 | Netzer | 73/504.16 |
| 5,767,405 A | 6/1998 | Bernstein et al. | 73/504.16 |
| 5,783,973 A | 7/1998 | Weinberg et al. | 331/35 |
| 5,795,988 A | 8/1998 | Lo et al. | 73/1.77 |
| 5,796,001 A | 8/1998 | Greiff et al. | 73/504.16 |
| 5,869,760 A | 2/1999 | Geen | 73/504.12 |
| 5,886,816 A | 3/1999 | Faris | 359/464 |
| 5,892,153 A | 4/1999 | Weinberg et al. | 73/504.16 |
| 5,895,850 A | 4/1999 | Buestgens | 73/504.12 |
| 5,895,851 A | 4/1999 | Kano et al. | 73/504.04 |
| 5,911,156 A | 6/1999 | Ward et al. | 73/504.16 |
| 5,918,280 A | 6/1999 | Gang et al. | 73/504.12 |
| 5,920,012 A | 7/1999 | Pinson | 73/504.12 |
| 5,945,600 A | 8/1999 | Touge et al. | 73/504.14 |
| 5,952,572 A | 9/1999 | Yamashita et al. | 73/504.04 |
| 5,955,668 A | 9/1999 | Hsu et al. | 73/504.12 |
| 5,987,986 A | 11/1999 | Wyse et al. | 73/504.12 |
| 5,992,233 A | 11/1999 | Clark | 73/514.35 |
| 6,009,751 A | 1/2000 | Ljung | 73/504.02 |
| 6,032,531 A | 3/2000 | Roszhart | 73/504.04 |
| 6,044,707 A | 4/2000 | Kato | 73/504.14 |
| 6,064,169 A | 5/2000 | Ward et al. | 318/646 |
| 6,067,858 A | 5/2000 | Clark et al. | 73/504.16 |
| 6,070,463 A | 6/2000 | Moriya et al. | 73/504.12 |
| 6,070,464 A | 6/2000 | Koury, Jr. et al. | 73/514.32 |
| 6,089,089 A | 7/2000 | Hsu | 73/504.12 |
| 6,122,961 A | 9/2000 | Geen et al. | 73/504.12 |
| 6,128,953 A | 10/2000 | Mizukoshi | 73/504.02 |
| 6,155,115 A | 12/2000 | Ljung | 73/504.12 |
| 6,164,134 A | 12/2000 | Cargille | 73/504.02 |
| 6,189,381 B1 | 2/2001 | Huang et al. | 73/504.12 |
| 6,190,571 B1 | 2/2001 | Kato | 216/2 |
| 6,230,563 B1 | 5/2001 | Clark et al. | 73/504.04 |
| 6,250,156 B1 | 6/2001 | Seshia et al. | 73/502.12 |
| 6,250,157 B1 | 6/2001 | Touge | 73/504.12 |
| 6,257,059 B1 | 7/2001 | Weinberg et al. | 73/504.16 |
| 6,282,960 B1 | 9/2001 | Samuels et al. | 73/514.32 |
| 6,289,733 B1 | 9/2001 | Challoner et al. | 73/504.12 |
| 6,311,555 B1 | 11/2001 | McCall et al. | 73/488 |
| 6,321,598 B1 | 11/2001 | Iwaki et al. | 73/504.02 |
| 6,505,511 B1 | 1/2003 | Geen et al. | 73/504.12 |
| 6,516,666 B1 | 2/2003 | Li | 73/504.12 |
| 6,561,029 B2 | 5/2003 | Folkmer et al. | 73/504.14 |
| 6,742,389 B2 * | 6/2004 | Nguyen et al. | 73/504.12 |
| 6,742,390 B2 * | 6/2004 | Mochida et al. | 73/504.14 |
| 6,767,758 B1 | 7/2004 | Geen | 438/48 |
| 6,837,107 B2 * | 1/2005 | Geen | 73/504.04 |
| 6,860,151 B2 | 3/2005 | Flatt et al. | 73/504.16 |
| 7,036,372 B2 * | 5/2006 | Chojnacki et al. | 73/504.12 |
| 7,093,487 B2 * | 8/2006 | Mochida | 73/504.14 |
| 2003/0005767 A1 | 1/2003 | Hulsing, II | 73/514.02 |
| 2003/0131664 A1 | 7/2003 | Mochida et al. | 73/504.12 |
| 2003/0131669 A1 | 7/2003 | Osawa | 73/861.355 |

FOREIGN PATENT DOCUMENTS

| | | |
|---|---|---|
| WO | WO96/39615 | 12/1996 |
| WO | WO 01/79862 A1 | 10/2001 |

OTHER PUBLICATIONS

Seshia et al. *Integrated Microelectromechanical Resonant Output Gyroscope*, updated, online <http://hera.berkeley.edu/IRO/Summary/o1abstracts/aseshia.1.html>, printed Feb. 6, 2002, 2 pages.

Geen et al. *Single-Chip Surface Micromachined Integrated Gyroscope with 50°/h Allan Deviation*, IEEE Journal of Solid-State Circuits, vol. 37, No. 12, Dec. 2002, 7 pages.

*A Comb-drive Piezoresistive Vibratory Gyroscope*, online <http://mems.stanford.edu/~lian/gyro.html>, printed Feb. 6, 2002, 4 pages.

Authorized Officer Gregory Adam *The International Search Report and The Written Opinion of the International Searching Authority*, International Searching Authority, Aug. 3, 2005, 12 pages.

* cited by examiner

INERTIAL SENSOR WITH A LINEAR ARRAY OF SENSOR ELEMENTS

CROSS-REFERENCE TO RELATED APPLICATIONS

This application claims priority from U.S. Provisional Patent Application No. 60/561,931 entitled Inertial Sensor Array and Coupling Apparatus for the Same, filed on Apr. 14, 2004 in the names of John A. Geen, William A. Clark, and Jinbo Kuang, which is hereby incorporated herein by reference in its entirety.

This application is also related to a certain U.S. patent application Ser. No. 11/106,354 entitled COUPLING APPARATUS FOR INERTIAL SENSORS filed on even date herewith, which claims priority from the above-referenced provisional patent application and is hereby incorporated by reference in its entirety.

FIELD OF THE INVENTION

The invention generally relates to sensors and, more particularly, the invention relates to inertial sensors.

BACKGROUND OF THE INVENTION

Inertial sensors, such as MEMS gyroscopes, often are adversely affected by rotational vibration noise at the drive frequency (often referred to as "wobble"). In particular, MEMS gyroscopes can produce false readings if they are not capable of distinguishing between rotational vibration and the actual movement they are intended to detect.

Also, distortion of the geometry of a MEMS device having an oscillating mass, such as a gyroscope, can produce an imbalance in the forces transverse to a longitudinal drive finger. This imbalance can cause a net force that is indistinguishable from a Coriolis force. Consequently, a gyroscope can produce false outputs. There are at least two sources of these geometric distortions. One arises from surface shear of the substrate (e.g., from release/wafer curvature on dicing). Another arises from differential expansion of the package and applied accelerations (e.g., diagonally, G×G). Some causes of G×G error is discussed in Geen, J. A., "Progress in Integrated Gyroscopes," IEEE PLANS 2004 Proceedings, pp. 1-6, which is hereby incorporated herein by reference in its entirety.

SUMMARY OF THE INVENTION

Embodiments of the present invention provide an inertial sensor having at least two pairs of sensor elements configured in a linear array. Each sensor element has a frame and a movable mass suspended within the frame. The frames of each pair of sensor elements are coupled so that the frames are allowed to move in anti-phase to one another along parallel axes but are substantially prevented from moving in phase with one another.

In accordance with one aspect of the invention there is provided an inertial sensor having at least one substrate and at least two pairs of sensor elements configured in a linear array substantially in a plane above the at least one substrate. Each pair of sensor elements includes a first sensor element having a first resonator suspended in a first frame and a second sensor element having a second resonator suspended within a second frame. All of the frames are substantially aligned along a first axis in the plane. The frames of each pair are configured to move in anti-phase to one another along parallel axes in the plane normal to the first axis.

The first and second resonators are typically caused to move co-linearly and in anti-phase to one another along the first axis. Rotation of the at least one substrate about an axis normal to the plane typically causes the movements of the frames.

Each pair of sensor elements may include a first coupling interconnecting the first and second frames. The first coupling may include at least one bar coupled between the first and second frames, the at least one bar supported by structures anchored to the at least one substrate, the structures allowing the at least one bar to rotate at a pivot point when the frames move in anti-phase to one another but substantially preventing in-phase movements of the frames.

In one exemplary embodiment, the first coupling includes a first pair of short flexures extending from one of the frames and interconnected by a first long flexure; a second pair of short flexures extending from the other of the frames and interconnected by a second long flexure; a bar coupling the first long flexure to the second long flexure substantially at the midpoints of the first and second long flexures; and an anchor flexure supporting the bar, the anchor flexure intersecting with the bar substantially at the midpoints of the bar and the anchor flexure, each end of the anchor flexure anchored to the substrate.

In another exemplary embodiment, the first coupling includes a first flexure extending from one of the frames; a second flexure extending from the other of the frames; a bar coupled between the first and second flexures; and at least one anchor flexure supporting the bar, each anchor flexure including a structure anchored at one end to the at least one substrate and folded back 180 degrees to meet with the bar.

The placement of the inertial sensors and the phase of the resonators are preferably coordinated so as to share a common centroid. Each frame typically includes finger structures that interdigitate with fixed sensing fingers anchored to the at least one substrate for electrostatically sensing the movements of the frames. Each resonator typically includes finger structures that interdigitate with fixed drive fingers anchored to the at least one substrate for electrostatically moving the resonators.

Within the linear array, the second frame of one pair is adjacent to the first frame of another pair. These adjacent frames may be configured to operate in phase with one another.

In accordance with another aspect of the invention there is provided an inertial sensor having at least one substrate and at least two pairs of sensor elements configured in a linear array substantially in a plane above the at least one substrate. Each pair of sensor elements includes a first sensor element having a first resonator suspended within a first frame and a second sensor element having a second resonator suspended within a second frame. All of the frames are substantially aligned along a first axis in the plane. The inertial sensor also includes means for operating the frames of each pair of sensor elements in anti-phase to one another along parallel axes in the plane normal to the first axis.

The inertial sensor typically also includes means for moving the resonators such that the first and second resonators are caused to move co-linearly and in anti-phase to one another along the first axis. Rotation of the at least one substrate about an axis normal to the plane causes the movements of the frames.

The inertial sensor may also include means for interconnecting the first and second frames of each pair of sensor elements. The interconnecting means may include at least one bar coupled between the first and second frames and means for supporting the at least one bar so as to allow the at least one bar to rotate at a pivot point when the frames move in anti-phase to one another but substantially prevent in-phase movements of the frames.

In one exemplary embodiment, the interconnecting means includes a first pair of short flexures extending from one of the frames and interconnected by a first long flexure; a second pair of short flexures extending from the other of the frames and interconnected by a second long flexure; a bar coupling the first long flexure to the second long flexure substantially at the midpoints of the first and second long flexures; and an anchor flexure supporting the bar, the anchor flexure intersecting with the bar substantially at the midpoints of the bar and the anchor flexure, each end of the anchor flexure anchored to the substrate.

In another exemplary embodiment, the interconnecting means includes a first flexure extending from one of the frames; a second flexure extending from the other of the frames; a bar coupled between the first and second flexures; and at least one anchor flexure supporting the bar, each anchor flexure including a structure anchored at one end to the at least one substrate and folded back 180 degrees to meet with the bar.

The placement of the inertial sensors and the phase of the resonators are preferably coordinated so as to share a common centroid. The inertial sensor typically also includes means for sensing the movements of the frames.

Within the linear array, the second frame of one pair is adjacent to the first frame of another pair. These adjacent frames may be configured to operate in phase with one another.

BRIEF DESCRIPTION OF THE DRAWINGS

The foregoing and advantages of the invention will be appreciated more fully from the following further description thereof with reference to the accompanying drawings wherein.

The drawings are for illustrative purposes and may not be drawn to scale.

DETAILED DESCRIPTION OF A PREFERRED EMBODIMENT

In illustrative embodiments, an inertial sensor has at least two pairs of individual sensor elements configured in a linear array such that all share a common centroid. Each sensor element includes a frame and at least one resonator (mass) suspended within the frame. Although not required, the frames of each pair of sensor elements are preferably interconnected by a coupling apparatus that permits anti-phase movements of the frames but substantially prevents in-phase movements of the frames. The pairs of sensor elements are typically not interconnected. Details of illustrative embodiments are discussed below.

Figure 1:
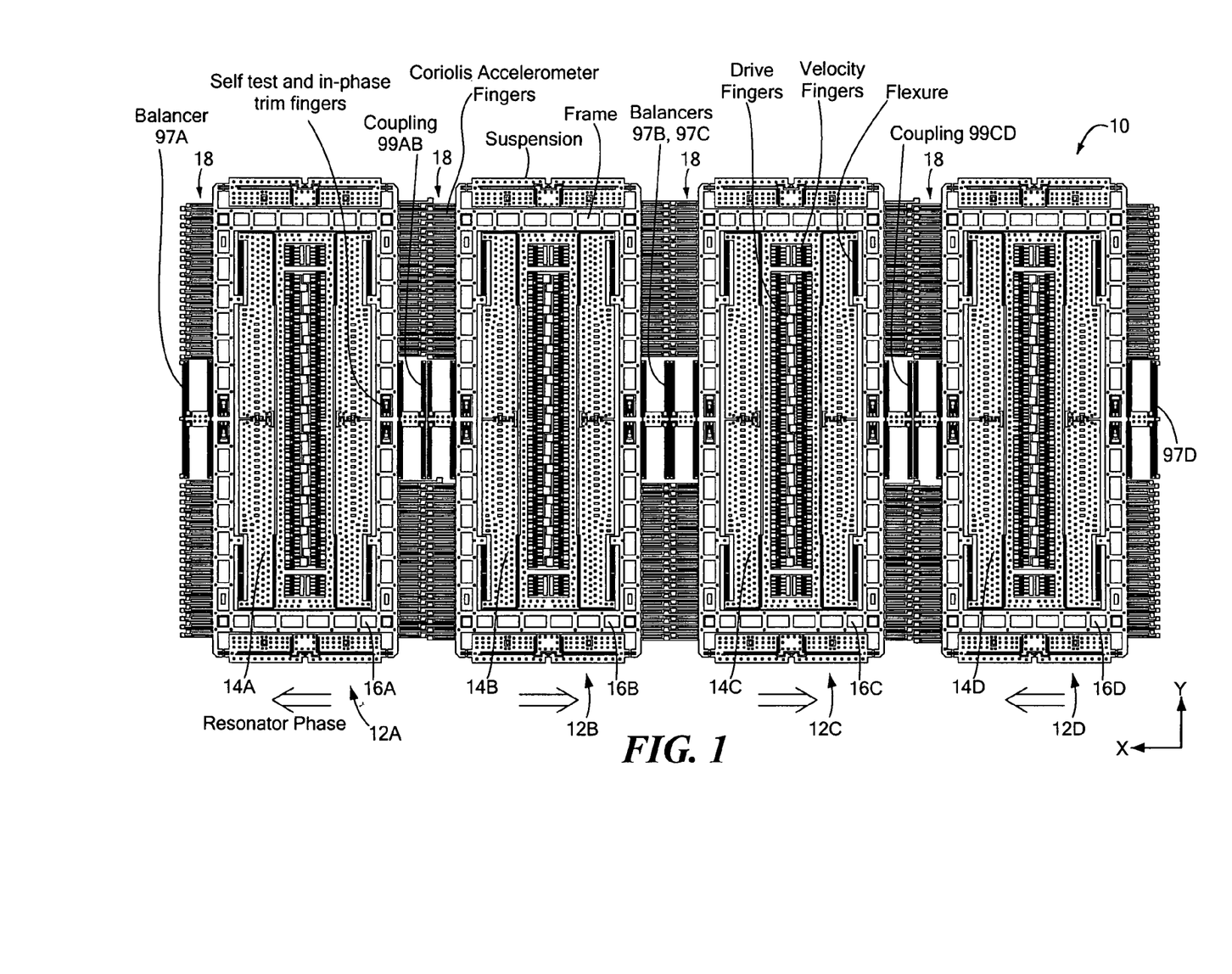
FIG. 1 schematically shows a linear array of gyroscopes configured in accordance with illustrative embodiments of the invention.

FIG. 1 schematically shows an array 10 of microelectromechanical systems (i.e., "MEMS") configured in accordance with illustrative embodiments of the invention. Specifically, the array 10 of MEMS devices together combine to effectively perform the function of a single gyroscope. To that end, the array 10 includes four MEMS gyroscopes 12A-D that all are secured to a common underlying substrate (not shown). Alternatively, the MEMS gyroscopes 12A-12D could be secured to different substrates.

Each gyroscope 12A-12D includes at least one oscillating mass (referred to herein as "resonator 14A, 14B, 14C, and 14D," respectively, or "resonator 14" generally) that 1) oscillates at a constant frequency along the X-axis and 2) is coupled with a single accelerometer frame (referred to herein as "frame 16A, 16B, 16C, or 16D," respectively, or "frame 16" generally). The resonator 14 illustratively is compliant in the X-direction only, while the frame 16 is compliant in the Y-direction only. Accordingly, rotation of any one of the gyroscopes 12A-12D about the Z-axis causes its resonator 14 to produce a Coriolis force that imparted to the accelerometer frame 16. Upon receipt of this Coriolis force, the frame 16 moves along the Y-axis. Capacitively coupled fingers 18 detect this Y-movement, which is translated into a signal representing the magnitude of the angular acceleration.

In illustrative embodiments, the gyroscopes 12A-12D are similar to those disclosed in U.S. Pat. Nos. 6,505,511 and 6,122,961, the disclosures of which are incorporated herein, in their entireties, by reference. The gyroscopes 12A-12D also may be similar to those disclosed in U.S. Pat. No. 6,877,374, the disclosure of which also is incorporated herein, in its entirety, by reference.

As noted above, in illustrative embodiments, the different gyroscopes 12A and 12D have a common centroid with the gyroscopes producing anti-phase signals 12B and 12C. The array 10 therefore is configured to position the gyroscopes 12A-12D and phase the respective resonators 14 in a manner that accomplishes this end. The specific placement, number of gyroscopes 12A-12D, and the phase of their resonators 14 thus are coordinated to ensure that they share a common centroid.

FIG. 1 shows an exemplary arrangement that produces the desired result. In particular, the array 10 includes a first pair of gyroscopes 12A/B having the first and second gyroscopes 12A and 12B, and a second pair of gyroscopes 12 C/D having the third and fourth gyroscopes 12C and 12D. As shown, the resonators 14 in each pair operate 180 degrees out of phase and their frames 16 are coupled together in the manner discussed below. The first pair of gyroscopes 12A/B, however, is not coupled with the second pair 12C/D.

When positioned in the manner shown in FIG. 1, the first gyroscope 12A and the fourth gyroscope 12D resonate in phase, while the second and third gyroscopes 12B and 12C resonate in phase. Accordingly, the following equation is true:

$$V_1 + V_4 = V_2 + V_3,$$

where:

$V_1$ is the vector distance of the first gyroscope 12A to a point of rotation, $V_2$ is the vector distance of the second gyroscope 12B to a point of rotation, $V_3$ is the vector distance of the third gyroscope 12C to a point of rotation, and V4 is the vector distance of the fourth gyroscope 12D to a point of rotation.

Note that a sign of the vector distance should be taken into account when considering this equation. When this relationship holds, the gyroscope as a whole becomes substantially insensitive to angular accelerations about that point of rotation to the extent that the responses of the frames match each other. The couplings overcome the mismatches induced by manufacturing tolerances and thereby improve the rejection of angular acceleration.

This arrangement nevertheless should not adversely affect the array 10 from detecting the underlying angular velocity for which it is designed.

Accordingly, embodiments of the invention should be substantially insensitive surface shear and also, as noted above, cause angular acceleration noise to cancel.

Figure 2:
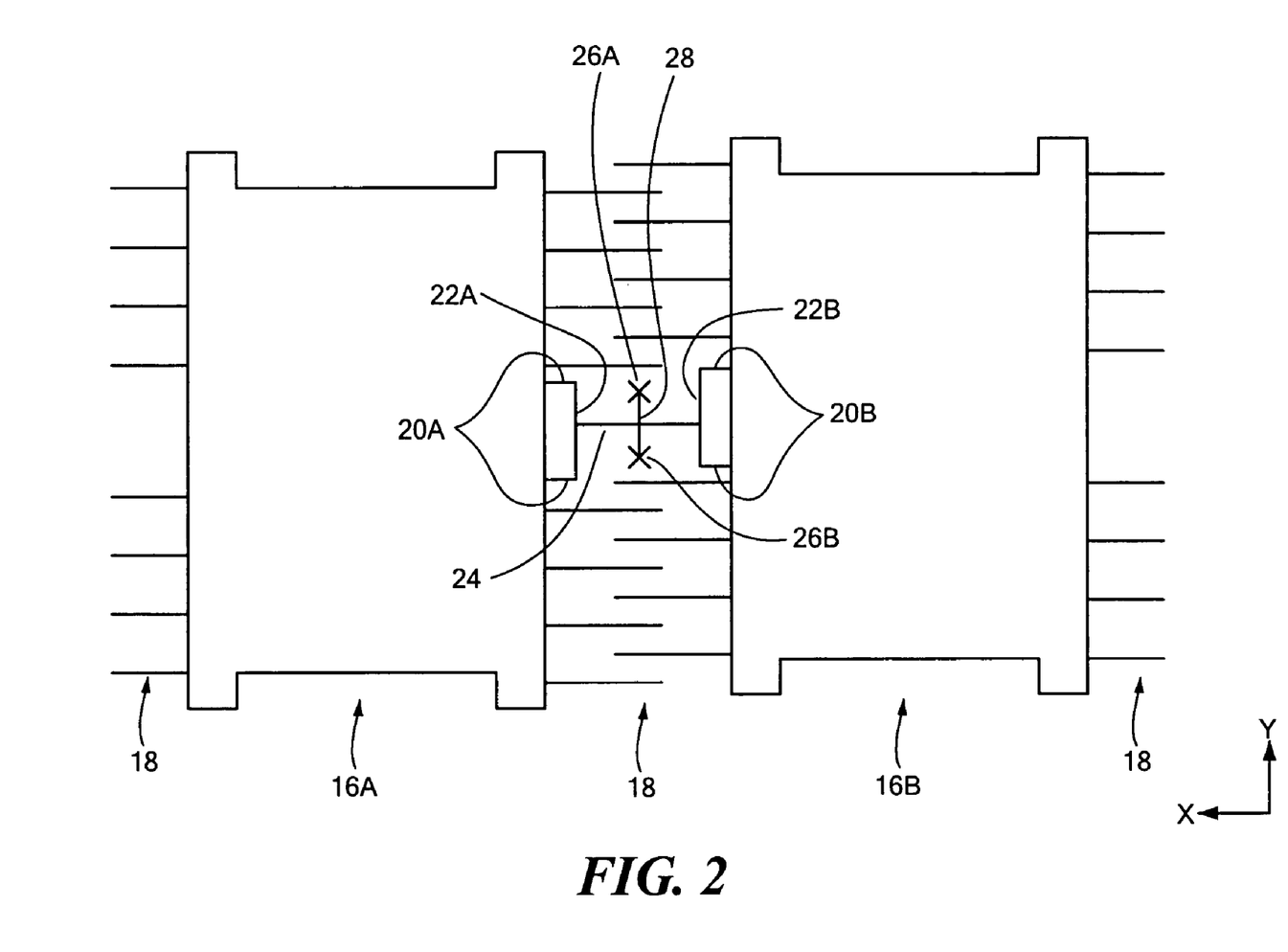
FIG. 2 schematically shows a coupling apparatus for coupling two frames shown in FIG. 1 in accordance with illustrative embodiments of the invention.

As noted above, the individual frames 16 within each pair are coupled in a manner that facilitates operation. Specifically, frames 16A and 16B are coupled by coupling 99AB, while frames 16C and 16D are coupled by coupling 99CD (referred to herein as "coupling apparatus 99" generally). In illustrative embodiments, each pair of frames 16 is coupled to ensure that they can move in anti-phase (i.e., 180 degrees out of phase) only, although the two pairs of frames are not interconnected. FIG. 2 schematically shows more details of a mechanical coupling apparatus 99 for securing two of the frames. Although embodiments of the coupling apparatus 99 apply to any of the frames 16 shown, the frames 16 are identified in FIG. 2 as the first and second frames 16A and 16B for simplicity.

Specifically, the first frame 16A has a first pair of short flexures 20A that are coupled with a first long flexure 22A. In a corresponding manner, the second frame 16B has a second pair of short flexures 20B that are coupled with a second long flexure 22B. A bar 24 secures the first long flexure 22A to the second long flexure 22B. To provide some stability, a pair of anchors 26A and 26B extend on two sides of the bar 24 and couple with it by means of an anchor flexure 28.

This arrangement is substantially noncompliant when the two frames 16A and 16B are urged to move in phase. In contrast, this arrangement is substantially compliant when the two frames 16A and 16B are urged to move in anti-phase. In other words, when the first frame 16A is urged upwardly along the Y-axis, the second frame 16B is urged downwardly along the Y-axis. If both are urged upwardly along the Y-axis, however, this arrangement should be substantially non-compliant. In some embodiments, this arrangement permits the frames 16A and 16B to rotate to some extent as they move in the Y-direction.

Figure 3:
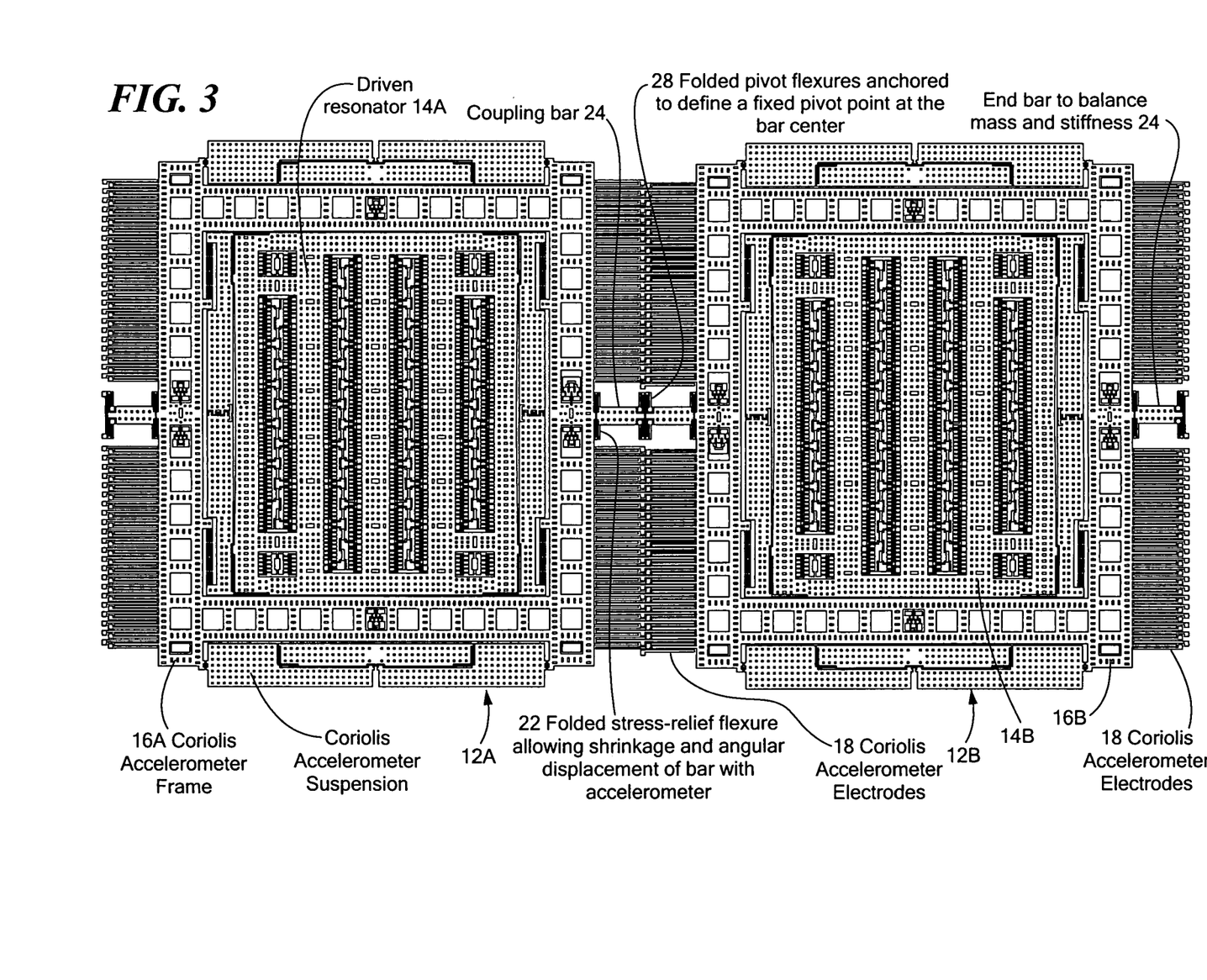
FIG. 3 schematically shows additional details of an alternative embodiment of a first pair of gyroscopes.
Figure 4:
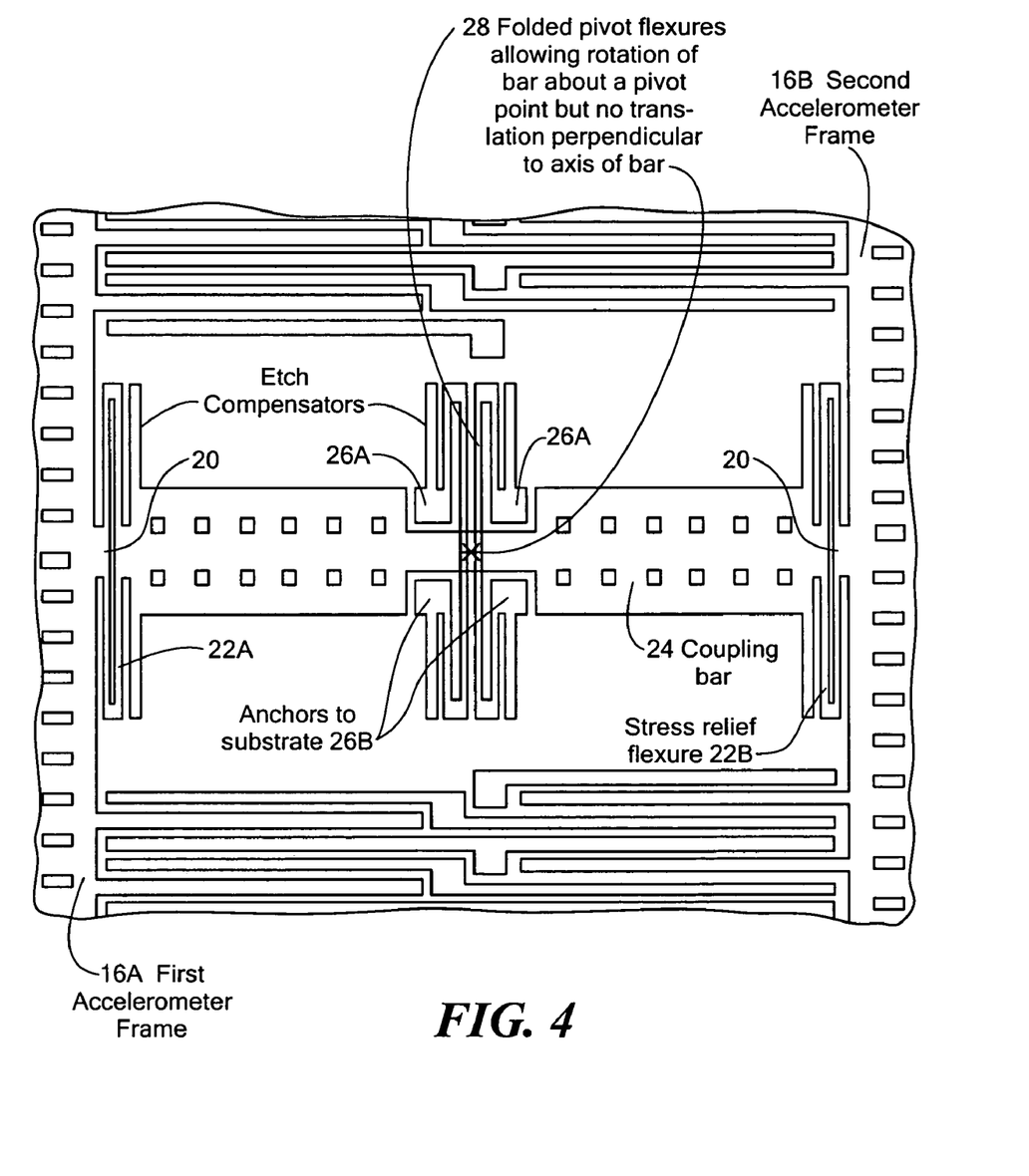
FIG. 4 shows more detail of the specific coupling apparatus used by the gyroscope pair shown in FIG. 3.

FIG. 3 schematically shows additional details of an alternative embodiment of the first pair of frames 16A and 16B. As shown, this embodiment also has the resonator 14, frame 16, coupling apparatus, and other components similar to those discussed above. FIG. 4 shows more detail of the specific coupling apparatus shown in FIG. 3. Note that this coupling apparatus may be used with other gyroscope configurations, including those shown in FIG. 1.

As shown in FIG. 4, the anchor flexure 28 actually extends outwardly and then folds back 180 degrees to meet with the bar 24. In addition, the coupling apparatus also has etch compensators. See the text in FIG. 4, which notes that the folded anchor flexure 28 allows rotation of the bar 24 about a pivot point, but no translation perpendicular to the axis of the bar 24. Also, rather than have a pair of short flexures 20 on each frame, this embodiment uses a single short flexure 20 on each frame.

In addition to ensuring that the frames 16A and 16B move in anti-phase, this flexure arrangement also reduces the potentially adverse effects of material shrinkage and G cross G error. This G cross G error arises when there is in-phase movement of the frames, and this is suppressed or reduced by the couplings.

The coupling apparatus 99 effectively add mass and stiffness to the movements of the frames 16. Since each frame is only coupled to an adjacent frame along one of its sides, the coupling apparatus 99 effectively unbalances the movements of each frame. Therefore, the array 10 preferably includes a number of balancers (referred to herein as "balancers 97A, 97B, 97C, and 97D," respectively, or "balancer 97" generally) to help offset the effects of the coupling apparatus 99. Specifically, a balancer 97 is preferably coupled to a side of each frame opposite the side with the coupling apparatus 99. Thus, balancer 97A is coupled to frame 16A along the side opposite the coupling 99AB, balancer 97B is coupled to frame 16B along the side opposite the coupling 99AB, balancer 97C is coupled to frame 16C along the side opposite the coupling 99CD, and balancer 97D is coupled to frame 16D along the side opposite the coupling 99CD. The configuration of each balancer 97 is typically the equivalent of half of a coupling apparatus 99 and therefore imparts substantially an equal but opposite mechanical effect on its respective frame 16.

Figure 5:
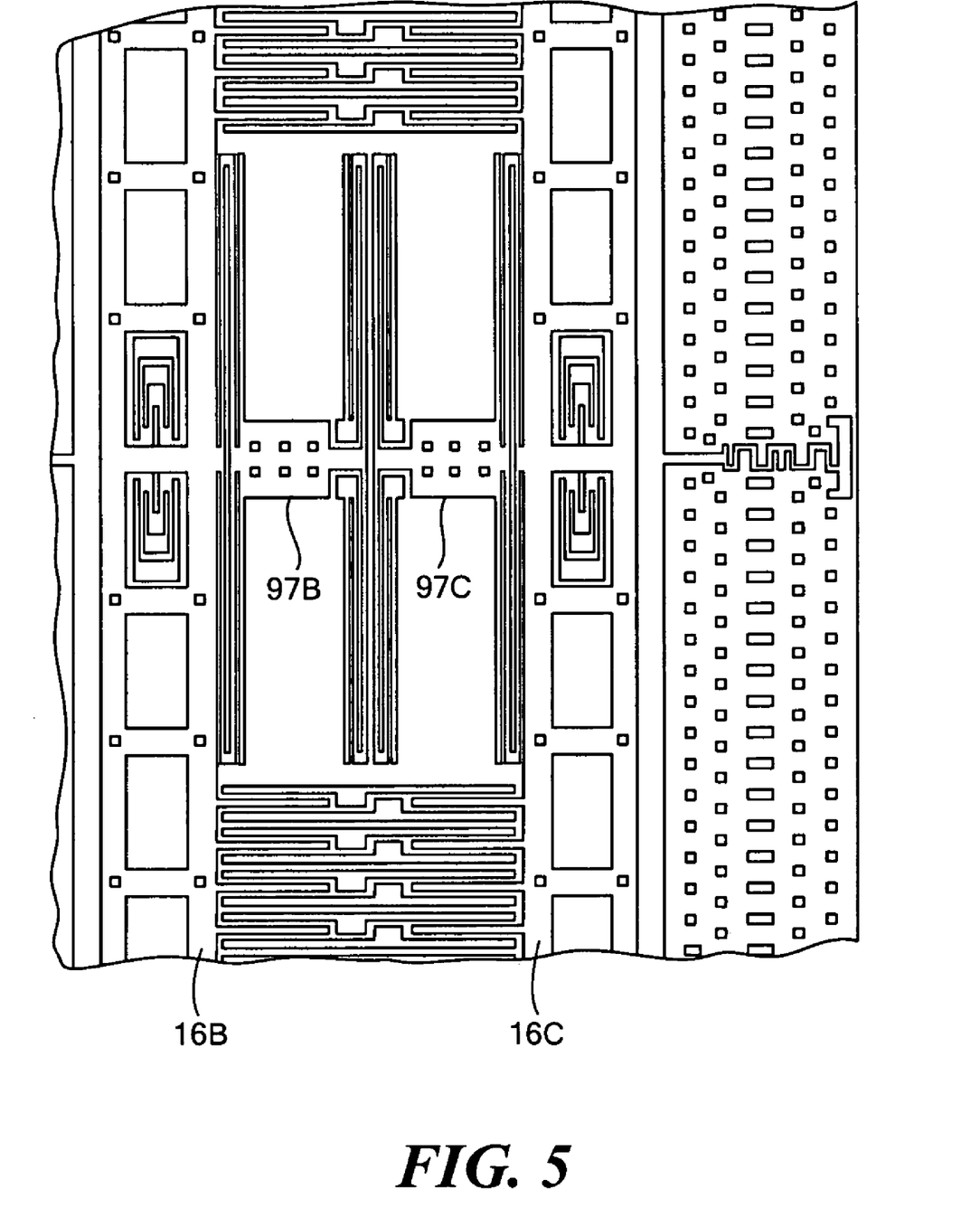
FIG. 5 shows more detail of specific balancers in accordance with illustrative embodiments of the invention.

FIG. 5 shows more detail of specific balancers 97 (in this example, balancers 97B and 97C that sit between the two pairs of sensor elements) in accordance with illustrative embodiments of the invention. As shown, the configuration of each balancer 97 is essentially the equivalent of half of a coupling apparatus as shown in FIG. 4. It should be noted that, unlike the coupling apparatus 99, there is no coupling between the two adjacent balancers 97B and 97C.

In illustrative embodiments, the accelerometers are run at about 17 volts.

The present invention may be embodied in other specific forms without departing from the true scope of the invention. The described embodiments are to be considered in all respects only as illustrative and not restrictive.

What is claimed is:

1. An inertial sensor comprising:

at least one substrate; and at least two pairs of sensor elements configured in a linear array substantially in a plane above the at least one substrate, each pair of sensor elements including:

a first sensor element having a first resonator suspended within a first frame; and a second sensor element having a second resonator suspended within a second frame, wherein:

all of the frames are substantially aligned along a first axis in the plane and the frames of each pair are configured to move in anti-phase to one another along parallel axes in the plane normal to the first axis.

2. An inertial sensor according to claim 1, wherein the first and second resonators are caused to move co-linearly and in anti-phase to one another along the first axis.

3. An inertial sensor according to claim 1, wherein rotation of the at least one substrate about an axis normal to the plane causes the movements of the frames.

4. An inertial sensor according to claim 1, wherein each pair of sensor elements further includes:

a first coupling interconnecting the first and second frames.

5. An inertial sensor according to claim 4, wherein the first coupling comprises:

at least one bar coupled between the first and second frames, the at least one bar supported by structures anchored to the at least one substrate, the structures allowing the at least one bar to rotate at a pivot point when the frames move in anti-phase to one another but substantially preventing in-phase movements of the frames.

6. An inertial sensor according to claim 5, wherein the first coupling comprises:
a first pair of short flexures extending from one of the frames and interconnected by a first long flexure;
a second pair of short flexures extending from the other of the frames and interconnected by a second long flexure;
a bar coupling the first long flexure to the second long flexure substantially at the midpoints of the first and second long flexures; and
an anchor flexure supporting the bar, the anchor flexure intersecting with the bar substantially at the midpoints of the bar and the anchor flexure, each end of the anchor flexure anchored to the substrate.

7. An inertial sensor according to claim 5, wherein the first coupling comprises:
a first flexure extending from one of the frames;
a second flexure extending from the other of the frames;
a bar coupled between the first and second flexures; and
at least one anchor flexure supporting the bar, each of the at least one anchor flexure including a structure anchored at one end to the at least one substrate and folded back 180 degrees to meet with the bar.

8. An inertial sensor according to claim 1, wherein the placement of the sensor elements and the phase of the resonators are coordinated so as to share a common centroid.

9. An inertial sensor according to claim 1, wherein each frame includes finger structures that interdigitate with fixed sensing fingers anchored to the at least one substrate for electrostatically sensing the movements of the frames.

10. An inertial sensor according to claim 1, wherein each resonator includes finger structures that interdigitate with fixed drive fingers anchored to the at least one substrate for electrostatically moving the resonators.

11. An inertial sensor according to claim 1, wherein the second frame of one pair is adjacent to the first frame of another pair, and wherein said adjacent frames are configured to operate in phase with one another.

12. An inertial sensor comprising:
at least one substrate; and
at least two pairs of sensor elements configured in a linear array substantially in a plane above the at least one substrate, each pair of sensor elements including:
a first sensor element having a first resonator suspended within a first frame; and
a second sensor element having a second resonator suspended within a second frame, wherein:
all of the frames are substantially aligned along a first axis in the plane, and wherein the inertial sensor further comprises means for operating the frames of each pair of sensor elements in anti-phase to one another along parallel axes in the plane normal to the first axis.

13. An inertial sensor according to claim 12, further comprising:
means for moving the resonators such that the first and second resonators are caused to move co-linearly and in anti-phase to one another along the first axis.

14. An inertial sensor according to claim 12, wherein rotation of the at least one substrate about an axis normal to the plane causes the movements of the frames.

15. An inertial sensor according to claim 12, further comprising:
means for interconnecting the first and second frames of each pair of sensor elements.

16. An inertial sensor according to claim 15, wherein the interconnecting means comprises:
at least one bar coupled between the first and second frames; and
means for supporting the at least one bar so as to allow the at least one bar to rotate at a pivot point when the frames move in anti-phase to one another but substantially prevent in-phase movements of the frames.

17. An inertial sensor according to claim 16, wherein the interconnecting means comprises:
a first pair of short flexures extending from one of the frames and interconnected by a first long flexure;
a second pair of short flexures extending from the other of the frames and interconnected by a second long flexure;
a bar coupling the first long flexure to the second long flexure substantially at the midpoints of the first and second long flexures; and
an anchor flexure supporting the bar, the anchor flexure intersecting with the bar substantially at the midpoints of the bar and the anchor flexure, each end of the anchor flexure anchored to the substrate.

18. An inertial sensor according to claim 16, wherein the interconnecting means comprises:
a first flexure extending from one of the frames;
a second flexure extending from the other of the frames;
a bar coupled between the first and second flexures; and
at least one anchor flexure supporting the bar, each of the at least one anchor flexure including a structure anchored at one end to the at least one substrate and folded back 180 degrees to meet with the bar.

19. An inertial sensor according to claim 12, wherein the placement of the sensor elements and the phase of the resonators are coordinated so as to share a common centroid.

20. An inertial sensor according to claim 12, further comprising:
means for sensing the movements of the frames.

21. An inertial sensor according to claim 12, wherein the second frame of one pair is adjacent to the first frame of another pair, and wherein said adjacent frames are configured to operate in phase with one another.

* * * * *

UNITED STATES PATENT AND TRADEMARK OFFICE
CERTIFICATE OF CORRECTION

PATENT NO. : 7,287,428 B2
APPLICATION NO. : 11/106039
DATED : October 30, 2007
INVENTOR(S) : John A. Geen Page 1 of 1

It is certified that error appears in the above-identified patent and that said Letters Patent is hereby corrected as shown below:

On title page, item 12,
replace "Green"
with --Geen--

On title page, item 75 Inventor,
replace "John A. Green"
with --John A. Geen--

Signed and Sealed this

Eighth Day of April, 2008

JON W. DUDAS
*Director of the United States Patent and Trademark Office*